(12) United States Patent  
Murphy et al.

(10) Patent No.: US 11,915,189 B2  
(45) Date of Patent: *Feb. 27, 2024

(54) SYSTEMS AND METHODS FOR TRIP MANAGEMENT

(71) Applicant: FedEx Corporate Services, Inc., Collierville, TN (US)

(72) Inventors: William S. Murphy, Germantown, TN (US); Kenneth L. Milman, Memphis, TN (US); Zachary S. Perry, Memphis, TN (US); Jesse Gately, Fort Collins, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/119,961

(22) Filed: Mar. 10, 2023

(65) Prior Publication Data

US 2023/0206169 A1  Jun. 29, 2023

Related U.S. Application Data

(63) Continuation of application No. 16/877,946, filed on May 19, 2020, now Pat. No. 11,625,668, which is a (Continued)

(51) Int. Cl.
*G06Q 10/0833* (2023.01)
*G06Q 10/08* (2023.01)

(52) U.S. Cl.
CPC ........ *G06Q 10/0833* (2013.01); *G06Q 10/08* (2013.01)

(58) Field of Classification Search
CPC ............................ G06Q 10/08; G06Q 10/0833
See application file for complete search history.

(56) References Cited

U.S. PATENT DOCUMENTS

| 5,347,274 A | 9/1994 | Hassett |
| 5,686,888 A | 11/1997 | Welles, II et al. |

(Continued)

FOREIGN PATENT DOCUMENTS

| CN | 202066958 U | 12/2009 |
| CN | 102196038 A | 9/2011 |

(Continued)

OTHER PUBLICATIONS

Peter Ruppel, "Anonymous user tracking for location-based community services", published by Springer-Verlag in 2006, all pages (Year: 2006).*

(Continued)

*Primary Examiner* — Omar Zeroual
(74) *Attorney, Agent, or Firm* — FINNEGAN, HENDERSON, FARABOW, GARRETT & DUNNER, LLP

(57) ABSTRACT

There is disclosed a method of providing information about a package in transit. The method involves receiving environmental data collected by a sensor associated with the package during transit and identifying contextual data about the package that is associated with the environmental data. The method also involves selectively providing access to the environmental and contextual data together as elements in an information feed to a plurality of parties, wherein the contextual data comprises at least one comment made by a party on an element in the information feed, and wherein one or more elements in the information feed are listed in chronological order beginning at a start time of the transit of the package.

20 Claims, 7 Drawing Sheets

Related U.S. Application Data continuation of application No. 13/834,088, filed on Mar. 15, 2013, now Pat. No. 10,783,481.

(60) Provisional application No. 61/614,279, filed on Mar. 22, 2012.

(56) References Cited

U.S. PATENT DOCUMENTS

| | | | |
|---|---|---|---|
| 5,771,455 A | 6/1998 | Kennedy, III et al. | |
| 5,917,433 A | 6/1999 | Keillor et al. | |
| 6,281,797 B1 | 8/2001 | Forster et al. | |
| 6,463,272 B1 | 10/2002 | Wallace et al. | |
| 6,492,904 B2 | 12/2002 | Richards | |
| 6,496,775 B2 | 12/2002 | McDonald, Jr. et al. | |
| 6,539,360 B1* | 3/2003 | Kadaba | G06Q 10/087 705/28 |
| 6,847,892 B2 | 1/2005 | Zhou et al. | |
| 6,952,645 B1 | 10/2005 | Jones | |
| 7,149,658 B2* | 12/2006 | Kadaba | G07C 5/008 340/572.1 |
| 7,187,278 B2 | 3/2007 | Biffar | |
| 7,212,829 B1* | 5/2007 | Lau | H04L 67/52 340/8.1 |
| 7,253,731 B2 | 8/2007 | Joao | |
| 7,468,927 B1* | 12/2008 | Battista | G01S 5/0027 365/207 |
| 7,480,867 B1* | 1/2009 | Racine | G06Q 10/08 715/744 |
| 7,937,244 B2* | 5/2011 | Kadaba | G07C 5/08 340/572.1 |
| 8,154,421 B2* | 4/2012 | Saltzman | H04Q 9/00 340/870.17 |
| 8,314,704 B2* | 11/2012 | Cova | G06Q 10/0833 340/568.1 |
| 8,334,773 B2* | 12/2012 | Cova | G06Q 10/08 340/572.1 |
| 8,369,867 B2* | 2/2013 | Van Os | H04W 4/02 455/457 |
| 8,456,302 B2* | 6/2013 | Stevens | G01S 5/0027 340/539.31 |
| 8,555,355 B2 | 10/2013 | Rathbun | |
| 8,572,000 B1* | 10/2013 | Weingarten | G06Q 10/00 705/320 |
| 8,725,165 B2* | 5/2014 | Lau | H04L 67/04 340/988 |
| 9,177,282 B2* | 11/2015 | Stevens | G06Q 10/0833 |
| 9,552,565 B2* | 1/2017 | Minogue | G06Q 10/083 |
| 9,576,264 B2* | 2/2017 | Bolene | G06Q 10/0833 |
| 9,924,315 B1* | 3/2018 | Cornwall | H04W 4/022 |
| 9,974,042 B2 | 5/2018 | Skaaksrud | |
| 10,404,615 B2* | 9/2019 | Marshall | H04L 63/107 |
| 10,438,162 B2 | 10/2019 | Sharma et al. | |
| 10,990,922 B1 | 4/2021 | Subramanian et al. | |
| 11,244,275 B2* | 2/2022 | Sakai | F25D 29/003 |
| 11,246,012 B1* | 2/2022 | Nugumanov | H04H 20/95 |
| 2002/0000916 A1 | 1/2002 | Richards | |
| 2002/0017989 A1* | 2/2002 | Forster | G01S 5/0018 340/945 |
| 2002/0032582 A1* | 3/2002 | Feeney, Jr. | G07F 17/0092 700/231 |
| 2002/0120475 A1 | 8/2002 | Morimoto | |
| 2003/0069831 A1* | 4/2003 | Le | G06Q 40/04 705/37 |
| 2003/0140064 A1* | 7/2003 | Klein | G06F 16/972 |
| 2003/0144985 A1* | 7/2003 | Ebert | G06Q 10/08 707/999.001 |
| 2003/0204407 A1* | 10/2003 | Nabors | G06Q 10/0833 705/333 |
| 2003/0217122 A1* | 11/2003 | Roese | H04L 67/04 709/219 |
| 2003/0233189 A1* | 12/2003 | Hsiao | G01C 21/26 340/988 |
| 2004/0024644 A1 | 2/2004 | Gui et al. | |
| 2004/0049428 A1* | 3/2004 | Soehnlen | G06K 17/0022 705/25 |
| 2004/0068502 A1* | 4/2004 | Vogedes | H04L 63/10 707/999.009 |
| 2004/0124977 A1* | 7/2004 | Biffar | G08G 1/20 340/8.1 |
| 2004/0186691 A1* | 9/2004 | LeBlanc | G01D 9/005 702/187 |
| 2005/0171738 A1* | 8/2005 | Kadaba | G07C 5/085 702/187 |
| 2005/0250440 A1* | 11/2005 | Zhou | G01S 5/0027 455/12.1 |
| 2005/0258955 A1* | 11/2005 | Gloekler | H04W 4/80 340/572.1 |
| 2005/0259658 A1* | 11/2005 | Logan | H04L 67/306 370/392 |
| 2005/0288947 A1* | 12/2005 | Mallonee | G06Q 10/0833 705/333 |
| 2006/0047419 A1* | 3/2006 | Diendorf | G06Q 10/08 340/552 |
| 2006/0173797 A1* | 8/2006 | Sheehan | G07B 17/00435 705/404 |
| 2006/0229895 A1* | 10/2006 | Kodger, Jr. | G06Q 10/08 705/333 |
| 2006/0235739 A1* | 10/2006 | Levis | G06Q 10/08 705/1.1 |
| 2006/0261946 A1 | 11/2006 | Himberger et al. | |
| 2007/0120736 A1* | 5/2007 | MacKenzie | G06Q 10/06 340/572.1 |
| 2007/0192191 A1* | 8/2007 | Neal | G07B 17/00435 705/14.26 |
| 2007/0229350 A1* | 10/2007 | Scalisi | H04L 43/00 342/350 |
| 2007/0262861 A1* | 11/2007 | Anderson | G06Q 10/08 455/456.1 |
| 2007/0271367 A1* | 11/2007 | Yardeni | H04L 67/52 709/206 |
| 2007/0290836 A1* | 12/2007 | Ainsworth | G06Q 10/08 340/539.22 |
| 2008/0019516 A1 | 1/2008 | Frransdonk | |
| 2008/0032703 A1* | 2/2008 | Krumm | H04W 4/029 455/456.1 |
| 2008/0071633 A1* | 3/2008 | Ozkan | G06Q 30/04 705/26.81 |
| 2008/0082812 A1 | 4/2008 | Kirshenbaum et al. | |
| 2008/0162034 A1* | 7/2008 | Breen | G01C 21/3461 701/533 |
| 2008/0174485 A1* | 7/2008 | Carani | G06Q 10/08 342/357.46 |
| 2008/0186166 A1* | 8/2008 | Zhou | G01S 5/0027 340/506 |
| 2008/0231438 A1 | 9/2008 | Curcio | |
| 2008/0281719 A1* | 11/2008 | Hall | G06Q 50/188 705/26.4 |
| 2009/0102659 A1* | 4/2009 | Evans | H04L 67/12 340/572.1 |
| 2009/0102660 A1* | 4/2009 | Evans | G01S 5/0294 340/572.1 |
| 2009/0134999 A1 | 5/2009 | Dobson et al. | |
| 2009/0207015 A1* | 8/2009 | Diem | H04W 84/12 340/539.13 |
| 2010/0014676 A1* | 1/2010 | McCarthy | G06F 21/6272 707/E17.001 |
| 2010/0076902 A1* | 3/2010 | Kraft | G06K 17/0022 340/572.1 |
| 2010/0141445 A1* | 6/2010 | Venkatasubramaniyam | H04W 4/02 704/8 |
| 2010/0146583 A1* | 6/2010 | Prehofer | G06Q 30/02 726/1 |
| 2010/0182148 A1* | 7/2010 | Fan | G06Q 10/0833 340/572.1 |
| 2010/0289644 A1* | 11/2010 | Slavin | G08B 13/2402 340/568.1 |
| 2010/0324782 A1* | 12/2010 | Gupta | B60W 30/18009 701/41 |

(56) References Cited

U.S. PATENT DOCUMENTS

| | | | |
|---|---|---|---|
| 2011/0016318 A1* | 1/2011 | Syngkon | G06Q 10/08 340/572.1 |
| 2011/0018707 A1 | 1/2011 | Dobson et al. | |
| 2011/0050423 A1* | 3/2011 | Cova | G06Q 10/08 705/333 |
| 2011/0074587 A1* | 3/2011 | Hamm | G06Q 10/0833 340/673 |
| 2011/0078089 A1* | 3/2011 | Hamm | G06Q 10/0833 705/333 |
| 2011/0082812 A1* | 4/2011 | Salemizadeh | G06Q 10/08 705/333 |
| 2011/0192191 A1 | 8/2011 | Timminns et al. | |
| 2011/0307390 A1 | 12/2011 | Ogg | |
| 2012/0023555 A1* | 1/2012 | Putterman | H04L 9/3271 705/333 |
| 2012/0030134 A1* | 2/2012 | Campbell | G06Q 30/00 705/333 |
| 2012/0188104 A1* | 7/2012 | Choi | G06Q 10/083 340/989 |
| 2012/0192291 A1* | 7/2012 | Diem | H04L 67/52 726/28 |
| 2012/0209787 A1* | 8/2012 | Foulds | G06Q 10/083 705/333 |
| 2012/0212323 A1* | 8/2012 | Skaaksrud | G06Q 10/08355 340/5.74 |
| 2012/0221552 A1* | 8/2012 | Reponen | G06F 16/9537 707/E17.014 |
| 2012/0268244 A1* | 10/2012 | Ljung | G08B 13/2462 340/5.65 |
| 2012/0310854 A1 | 12/2012 | Cova et al. | |
| 2013/0024393 A1* | 1/2013 | Fleur | G06Q 10/083 705/333 |
| 2013/0030134 A1 | 1/2013 | Ghasemi Hamedani et al. | |
| 2013/0094693 A1* | 4/2013 | Bolton | G06Q 10/0833 382/101 |
| 2013/0198060 A1* | 8/2013 | Whitehouse | G06Q 10/083 705/333 |
| 2013/0268191 A1* | 10/2013 | Telang | G06Q 10/08 701/468 |
| 2013/0297524 A1* | 11/2013 | Lau | H04W 4/029 705/333 |
| 2013/0324151 A1* | 12/2013 | Lee | H04W 24/00 455/456.1 |
| 2013/0346336 A1* | 12/2013 | Murphy | G06Q 10/083 705/333 |
| 2014/0123315 A1* | 5/2014 | Baker | G08G 5/0026 726/28 |
| 2014/0347193 A1* | 11/2014 | Ljung | H04L 67/04 340/870.01 |
| 2015/0262123 A1 | 9/2015 | Sharma et al. | |
| 2022/0172164 A1* | 6/2022 | Hamm | G06Q 10/0833 |

FOREIGN PATENT DOCUMENTS

| | | | | |
|---|---|---|---|---|
| WO | WO 01/75700 | 10/2001 | | |
| WO | WO 02/44865 | 6/2002 | | |
| WO | WO 2007/024987 | 3/2007 | | |
| WO | WO 2009/088538 | 7/2009 | | |
| WO | WO 2011/037800 | 3/2011 | | |
| WO | WO-2011037800 A2 * | 3/2011 | | G06K 7/10366 |
| WO | WO-2013134958 A1 * | 9/2013 | | G01C 21/20 |

OTHER PUBLICATIONS

James Scott, "Exploring end user preferences for location obfuscation, location-based services, and the value of location", published by UbiComp in 2010, all pages (Year: 2010).*
U.S. Appl. No. 60/263,877, filed Jan. 23, 2001.

* cited by examiner

| | Party | Phase | Permissions |
|---|---|---|---|
| 508 | Sender | Staged | Full |
| 510 | Sender | In Transit | Obfuscated |
| 512 | Sender | Delivered | Obfuscated |
| 514 | Shipper | Staged | Obfuscated |
| 516 | Shipper | In Transit | Full |
| 518 | Shipper | Delivered | Obfuscated |
| 520 | Receiver | Staged | Obfuscated |
| 522 | Receiver | In Transit | Obfuscated |
| 524 | Receiver | Delivered | Full |

SYSTEMS AND METHODS FOR TRIP MANAGEMENT

RELATED APPLICATION

This application is a continuation of U.S. patent application Ser. No. 16/877,946, filed May 19, 2020, which is a continuation of U.S. patent application Ser. No. 13/834,088, filed Mar. 25, 2013, which claims priority to U.S. Provisional Application No. 61/614,279, filed Mar. 22, 2012, the entire contents of all of which are hereby incorporated by reference.

TECHNICAL FIELD

The present disclosure generally relates to the field of computerized systems. More particularly, the disclosure relates to computerized systems and methods for tracking information associated with a journey of a package between an origin and a destination.

BACKGROUND INFORMATION

Some tracking systems allow a user to monitor the progress of a package during shipment by, for example, accessing a website and providing a reference or tracking number associated with the package. These systems may be limited, however, to only providing information on the location of the package at specified milestones during the package's journey. For example, these systems may only inform a user that a package has arrived at specific processing or distribution centers, but may not provide information about the package while it is travelling between these centers.

Providing additional information, such as near real-time environmental data and/or contextual information raises potential privacy concerns and/or security risks. For example, certain packages may contain contents that a shipper or recipient may not want third parties to know about. For example, thieves could track down and steal packages containing valuables if real-time location information on such packages is made available.

Accordingly, there is a need to provide a tracking system to provide detailed tracking or other information, without compromising the security and/or privacy of information associated with the package. It may be beneficial to implement the tracking system, in part, through a shared user interface.

SUMMARY

In accordance with disclosed embodiments, there is provided a method of providing information about a package in transit, the method comprising: receiving environmental data collected by a sensor associated with the package during transit; identifying contextual data about the package that is associated with the environmental data; and selectively providing access to the environmental and contextual data together as elements in an information feed to a plurality of parties, wherein the contextual data comprises at least one comment made by a party on an element in the information feed, and wherein one or more elements in the information feed are listed in chronological order beginning at a start time of the transit of the package.

In accordance with disclosed embodiments, there is further provided A computer-readable medium storing program instructions, which, when executed by at least one processor, cause the at least one processor to perform a method of providing information about a package in transit, the method comprising: receiving environmental data collected by a sensor associated with the package during transit; identifying contextual data about the package that is associated with the environmental data; and selectively providing access to the environmental and contextual data together as elements in an information feed to a plurality of parties, wherein the contextual data comprises at least one comment made by a party on an element in the information feed, and wherein one or more elements in the information feed are listed in chronological order beginning at a start time of the transit of the package.

In accordance with disclosed embodiments, there is further provided A host device for tracking information associated with a journey of a package from an origin, the host device comprising: an I/O unit configured to receive environmental data from a package sensor; a memory device configured to store the received environmental data; and a CPU configured to: identify contextual data about the package that is associated with the environmental data; and selectively provide access to the environmental and contextual data together as elements in an information feed to a plurality of parties, wherein the contextual data comprises at least one comment made by a party on an element in the information feed, and wherein one or more elements in the information feed are listed in chronological order beginning at a start time of the transit of the package.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate disclosed embodiments and together with the description, serve to explain the principles of the disclosed embodiments.

FIG. 5 illustrates an example of a table for identifying accessibility or visibility of environmental or contextual data to a plurality of parties.

DETAILED DESCRIPTION

Figure 1:
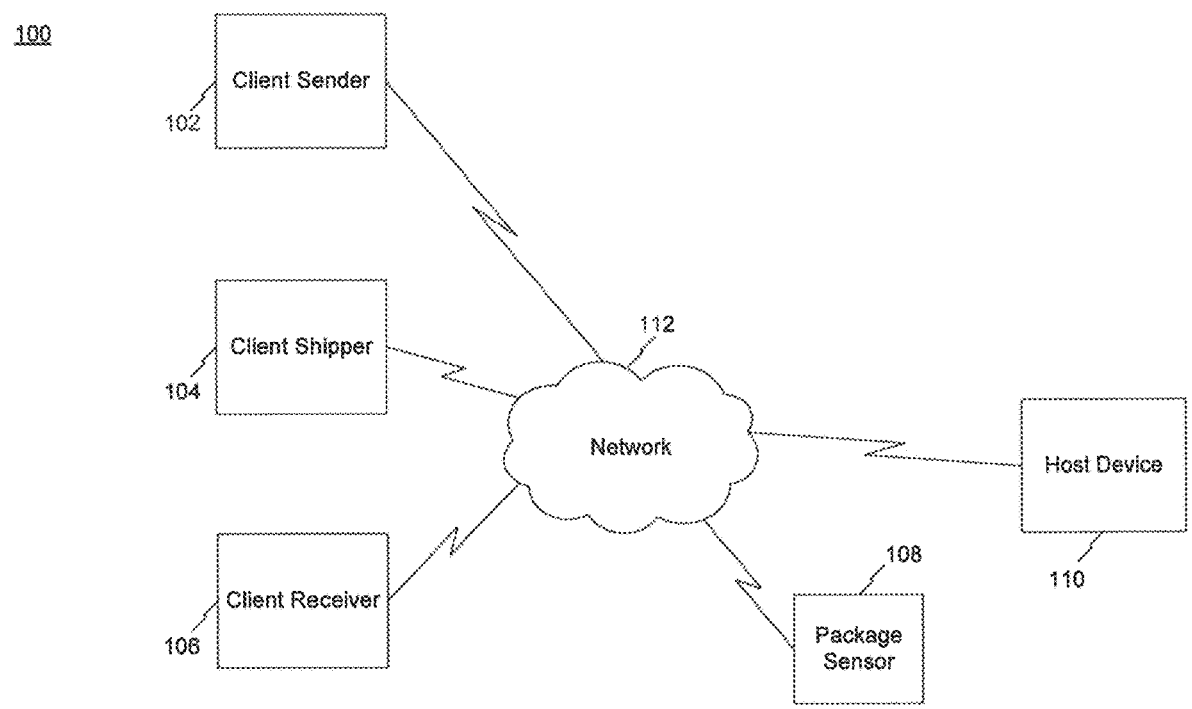
FIG. 1 illustrates a system for distributing environmental or contextual data.

This disclosure generally relates to systems and methods of tracking information associated with a package in transit. The systems and methods provide a party with information on the progress of a shipment throughout its journey from an origin to a destination.

The package includes, or is otherwise associated with, a sensor that collects environmental data, such as location data. The package may also be associated with contextual information derived from the data, such as user-initiated comments, system-generated notifications and/or predictive analytics. In one embodiment, predictive analytics involves predicting a schedule for a package in transit based on environmental and/or contextual data. The environmental or contextual data may be made available to interested users by, for example, posting information online to a website or sending the information by other electronic communication to user devices such as computers, or handheld devices like smart phones.

To maintain package content privacy and promote package security, the environmental or contextual data on the website or in other electronic communications may be obfuscated or blocked from access under certain circumstances. In some embodiments obfuscated information is information that has been collected but that has been selectively blocked from access or viewing. For example, when presented with information on a package a user will be able to determine from the presented information that certain package-related information has been collected but that the system has been programmed not to present certain information under certain circumstances. If the package is in transit, then a receiver of the package may not be able to view the exact current location of the package, and instead, may only be able to view its location half an hour ago. As another example, the receiver of the package may be able to see a range of the current location (e.g., a five mile area) instead of the exact location. In this way, the receiver may have access to the environmental or contextual data collected by the package sensor or host system, but certain data may be obfuscated at a particular stage of the journey to ensure the privacy and/or security of the data.

Moreover, although certain information may be blocked from the receiver during transit, that information would not be blocked from the shipper. For example, there may be a need to provide the exact location of the package to the shipper (or its associates) in order for the shipper to discharge their logistics or regulatory obligations. Therefore, when the shipper accesses the website while the package is in transit, it may be able to view the environmental data without obfuscation. Thus, the environmental data posted to the website may be blocked from some parties and not to others, depending on the stage of the journey.

Reference will now be made in detail to example embodiments, examples of which are illustrated in the accompanying drawings. Wherever possible, the same reference numbers will be used throughout the drawings to refer to the same or like parts.

FIG. 1 illustrates a system 100 for collecting and distributing environmental or contextual data associated with packages during shipment. System 100 may include different client devices. For example, system 100 may include a client sender 102, a client shipper 104, and a client receiver 106. Client sender 102 may be a computing device accessed by a sender of a package being shipped; client shipper 104 may be a computing device accessed by a shipper of the package being shipped; and client receiver 106 may be a computing device accessed by a receiver of a package being shipped. Client sender 102, a client shipper 104, and a client receiver 106 are examples only, and other devices and/or parties may be involved. Examples of devices which can be used by client sender 102, client shipper 104, and client receiver 106 include, but are not limited to, a computer, a smart phone, an 'app' on the smart phone, a mobile device, a hand-held device, or any that can enable the client to view data electronically.

System 100 also includes at least one package sensor 108, which may be inside or within proximity to a package in transit. For example, package sensor 108 may be inside the package, attached to the package, within the same truck as the package, or otherwise associated with the package. Package sensor 108 collects data about the environment of the package. For example, package sensor 108 may collect data about location, temperature, humidity, exposure to light, vibration, orientation, leaning, shock, audio, and/or video. A person of ordinary skill will recognize that package sensor 108 may collect other types of data related to the environment in or around a package, including, but not limited, to routing changes, weather conditions, and regulatory requirements.

In general, sensor 108 is associated with the package physically or is in electronic communication with the package. In disclosed embodiments, a sensor may be associated with multiple packages or multiple sensors may be associated with a single package. Data acquisition, management, and transmission in these instances are implemented using appropriate software program(s).

Environmental data collected by package sensor 108 is provided to a host device 110 that selectively posts data to web pages or otherwise provides data to legitimate interested parties. Host device 110 may include multiple devices and may include a back-end platform for managing information related to packages in transit. Host device 110 may query package sensor 108 for the data and/or package sensor 108 may transmit this data to host device 110. Host device 110 may also originate or calculate contextual information based on environmental data. For example, host device 110 may identify user comments posted about collected environmental data, notifications triggered by collected environmental data, or other contextual information. In disclosed embodiments, contextual information may include information collected by other systems, such as weather information or package scans.

Contextual information may include the result of calculations or algorithms performed by host device 110. For example, contextual information may be a "warning level" set as "low," "medium," or "high," depending on the detected temperature of a perishable item in transit. The warning level may indicate a danger that the item will spoil because of the temperature. This information may also result from more complex algorithms, such as whether a package is "on track" for delivery.

Generally, host device 110 may be accessible by various clients, such as client sender 102, client shipper 104, and/or client receiver 106, for example. The clients may access the website on host device 110 to view environmental or contextual data associated with a package being shipped.

Depending on the stage of delivery, host device 110 may block some of the environmental or contextual data to certain parties. This may be defined based on user preferences, regulatory requirements and/or other business rules of the shipper. For example, while the package is in transit, host device 110 may block location data from client sender 102 and client receiver 106, while allowing full access to client shipper 104. This is because client shipper 104 may need to know the exact information for internal purposes. And while client sender 102 and client receiver 106 may prefer having more detailed location information as compared to conventional systems, they may not need to know the exact location.

One way to obstruct the location data is that while the package is in transit, host device 110 may provide client sender 102 and client receiver 106 location data that is older than the actual information at the time that client sender 102 queries host device 110, for example, 30 minutes old. Another way is to provide a range of possible locations, for example, as a 5-mile range. The 5-mile range can be measured in radius, distance in one or more direction(s) from the real-time location of the package, or part distance and altitude when the package is on an aircraft, as determined by the shipper. It is not necessary for the 5-mile range to be the exact distance of the package from its real time location; the actual distance can be greater or shorter than 5 miles. The purpose of the 5-mile information-block is to prevent the client, receiver, or other third party from identifying the exact location of the package. Thus, it can be any distance from the package. In disclosed embodiments, the level of obfuscation may vary depending on some factor, such as location of the package. For example, in a dense location such as a city, the range of obfuscation (e.g., 5 miles) may be less than the range in the country side (e.g., 15 miles). Obfuscation levels may also vary and be dynamically determined by a location of the package, such as its proximity to nearby landmarks, mountain ranges, sensitive buildings, or city limits. Host device 110 may block this data because of privacy and/or security concerns. For example, if a party knew the exact location of a valuable shipment, the shipment could be intercepted and stolen.

More generally, the control of environmental or contextual data, such as visibility, suppression, or obfuscation, may be based on one or ore factors. One example, as discussed above, is that environmental or contextual data of a package can be controlled depending on the party seeking access to the data. Obfuscation may be based on a type of user. For example, a member of the public may see obfuscated data, whereas a party to the transaction may see real-time data. In disclosed embodiments, data may be controlled depending on the affiliation of a user with a company. For example, an employee of the shipping company may be able to view certain kinds of data that a user of the seller cannot view.

The control of environmental or contextual data may also depend on the location of the package or sensor. As discussed in the earlier example, environmental or contextual data may be obfuscated based on where the package is. Certain information may, for example, be obfuscated when the package is located on an airplane. Other types of information may be obfuscated when the package is in a certain country, in order to comply with regulation requirements of that country. Similarly, the control of environmental or contextual data may depend on a phase of the journey for a package, which may be defined by location, distance to a location, or a triggered event like a scan. Other triggered events may affect the control of environmental or contextual data. For example, third parties may only be able to monitor data when a temperature alert is triggered.

The devices of system 100 may interface via network 112. Network 112 may be a shared, public, or private network, may encompass a wide area or local area, and may be implemented through any suitable combination of wired and/or wireless communication networks. Furthermore, network 112 may comprise a local area network (LAN), a wide area network (WAN), an intranet, or the Internet. Network 112 may be a cloud network, a mesh network, or some other kind of distributed network. In some embodiments, some combination of client devices 102-108, package sensor 108, and host device 110 may be directly connected, via a wired or wireless connection, instead of connecting through network 112.

System 100 is an example, and the number and distribution of the various entities shown may be different depending on specific embodiments. For example, the components in system 100 may be combined and/or distributed over multiple entities, including other computers, handheld computers, mobile phones, tablet computers, or other computing platforms. Thus, the configuration described in system 100 is an example only and is not intended to be limiting.

Figure 2:
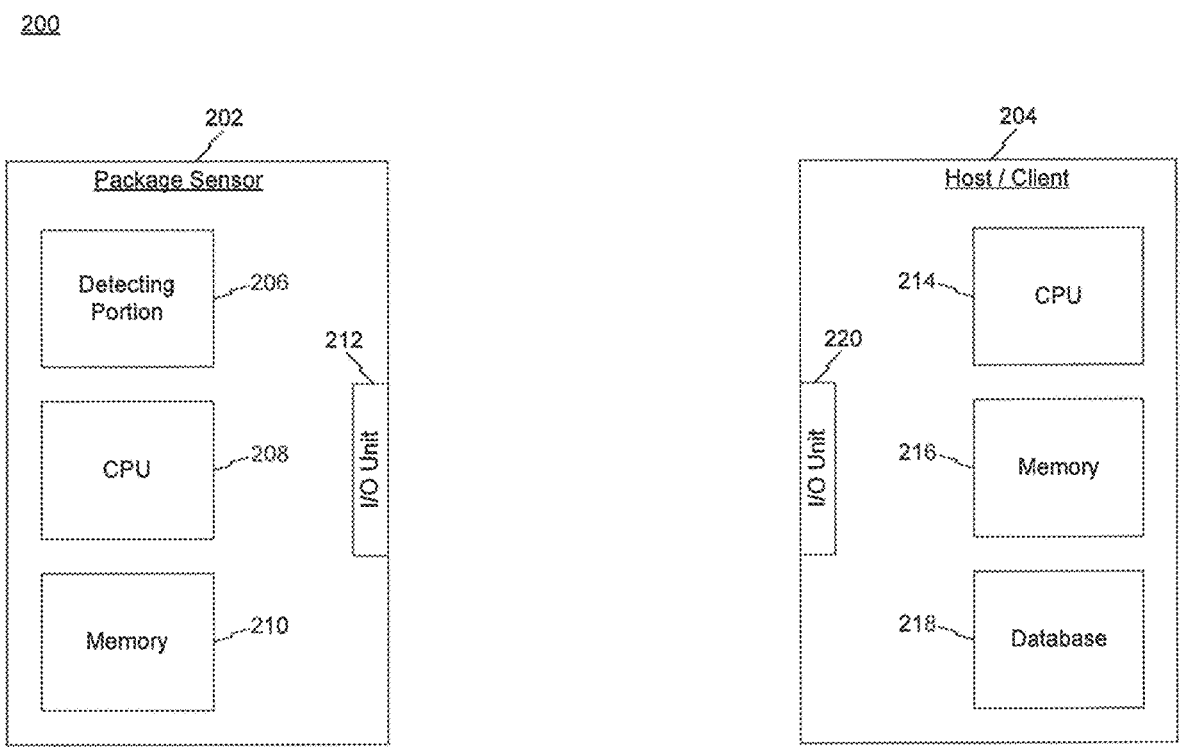
FIG. 2 illustrates devices of an example system for distributing environmental or contextual data.

FIG. 2 illustrates devices of an example system 200 for distributing environmental or contextual data. System 200 may include package sensor 202 and host/client device 204. Package sensor 202 may be similar to package sensor 108 from FIG. 1, and host/client device 204 may be similar to one of client devices 102-108 or host device 110. Both package sensor 202 and host/client device 204 may include general-purpose computing components configured to execute special-purpose instructions or code to perform certain actions.

Package sensor 202 may include detecting portion 206, which may include one or more software and/or hardware components for collecting data, such as environmental data. For example, detecting portion 206 may collect location information about itself. In some embodiments, location information may include the use of a Global Positioning System (GPS), Alternately, location information may be determined through cellular triangulation, wireless network association, the capture of fixed location scan, or the capture of mobile location scan.

In addition to location information, detecting portion 206 may collect other data about the environment surrounding package sensor 202. For example, detecting portion 206 may collect data about temperature, light level, motion, pressure, humidity, gas level, airflow, vibrations, radiation, time, audio, video, orientation, or other environmental conditions. If package sensor 202 is associated with a package in transit, the environment of the package may need to be within certain parameters, such as within a certain temperature, pressure, or humidity range. If the environment of the package is outside of certain parameters, then an alert or action may be triggered. In some embodiments, the alert or action may relate to sensing additional data. For example, a camera may be triggered to record video if sudden movement is detected by detecting portion 206. Moreover, in some embodiments, package sensor 202 may include numerous detecting portions 206, each of which may be configured to collect a different kind of environmental data. In some embodiments, a single detecting portion 206 may be capable of collecting different kinds of environmental data.

In addition to sensor data, contextual information may be created and shared. For example, users may provide comments based on the state of the package or for any other reason. Additionally, the system may generate automatic notifications to proactively make different user types aware of an exception. The system may also use the data stream in combination with historical information to provide predictive analytics about pace or other calculated tracking information.

Package sensor 202 may also include central processing unit (CPU) 208 and memory 210 to process data, such as the collected environmental data, inputted data, or data retrieved from a storage device. CPU 208 may include one or more processors configured to execute computer program instructions to perform various processes and methods. CPU 208 may read the computer program instructions from memory 210 or from any computer-readable medium. Memory 210 may include random access memory (RAM) and/or read only memory (ROM) configured to access and store information and computer program instructions. Memory 210 may also include additional memory to store data and information and/or one or more internal databases to store tables, lists, or other data structures.

Packages sensor 202 may include I/O Unit 212 for sending data over a network or any other medium. For example, I/O Unit 212 may send data over a network, point-to-point, and/or point-to-multipoint connection either wirelessly or over a cable.

Host/client device 204 may include a CPU 214 and/or a memory 216, which may be similar to CPU 208 and memory 210 from package sensor 202. Host/client device 204 may also include database 218. Database 218 may store large amounts of data, and may include a magnetic, semiconductor, tape, optical, or other type of storage device. In some embodiments, database 218 may store historical data for auditing purposes. Host/client device 204 may include an I/O Unit 220 for communicating with package sensor 202. I/O Unit 220 may be similar to I/O Unit 212 on package sensor 202.

System 200 is an example only, and the number and distribution of the various entities shown may be different depending on specific embodiments. For example, in some embodiments, package sensor 202 may not include detecting portion 206, CPU 208, and/or memory 210. In some embodiments, host/client device 204 may be distributed over multiple entities, including other distribution systems, sensors, computers, handheld computers, mobile phones, tablet computers, or other computing platforms. Package sensor 202 may similarly be implemented or distributed over any computing platform. Thus, the configuration described in system 200 is an example only and is not intended to be limiting.

Figure 3:
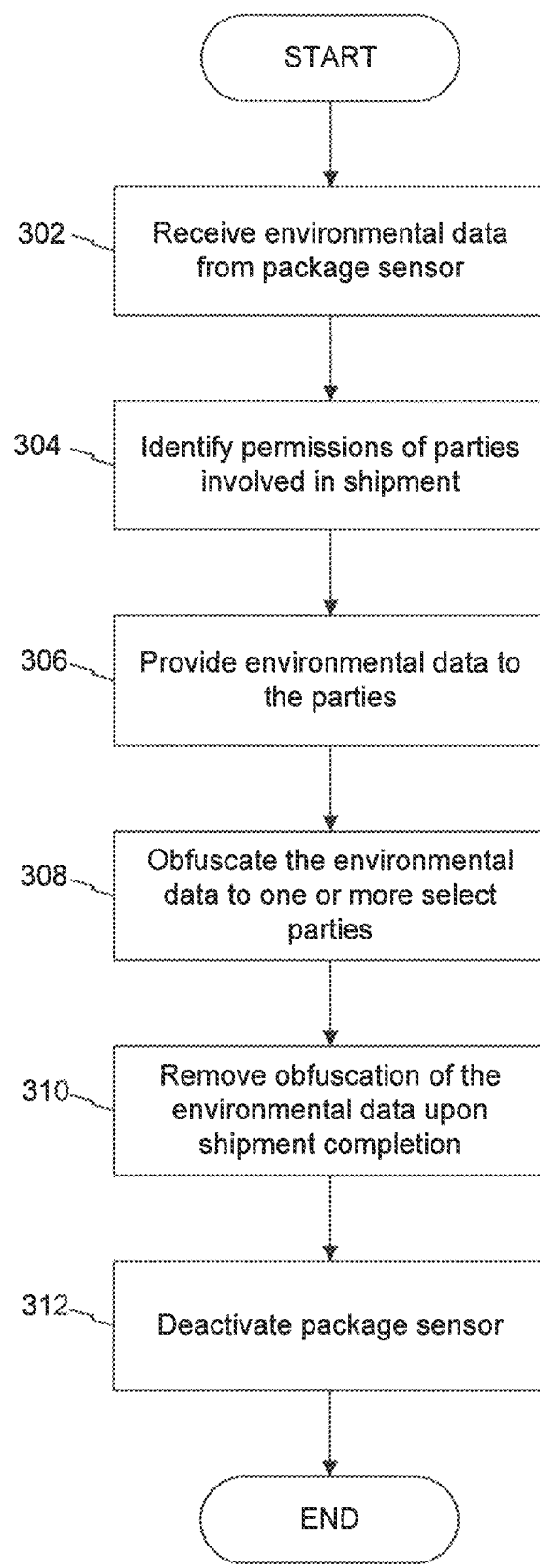
FIG. 3 illustrates the operations of an example method for obfuscating or blocking environmental or contextual data from one or more select parties.

FIG. 3 illustrates the operations of an example method 300 for obfuscating environmental or contextual data from one or more select parties. Method 300 may be executed by CPU 214 on host device 110. Method 300 may also be performed in conjunction with other components shown or not shown in system 100. As explained, in some implementations, some steps in method 300 are optional and can be rearranged. Additional steps can also be added to method 300.

To begin, host device 110 may receive environmental data from package sensor 108 associated with a package being shipped (step 302). The environmental data may be collected by package sensor 108, which may then push the collected environmental data to host device 110 and/or may send it to host device 110 in response to a query. The environmental data may relate to conditions in the vicinity of the package being shipped, such as information related to the location, temperature, humidity, etc., of the package.

Contextual data, on the other hand, may refer to other data related to a shipment that may have been derived from environmental data. For example, contextual data may include third party information feeds, such as FedEx package scans and weather information. This information may be displayed along with other data about a package being shipped.

Contextual data may further include user-generated comments on a user interface. For example, a user interface may include environmental data about a package in transit, such as temperature information. A user that views the user interface may comment in free-form text on the temperature information, and the comment may be available to other parties who may respond. This enables a discussion or collaboration by users of the shared user interface on environmental or other data.

Contextual data may further include system notifications generated by, for example, host device 110. The notifications may be automatically generated based on environmental or other data. For example, a system notification may be triggered on a change in temperature that may damage a particular package. Other system notifications may be based on a change of phase during a journey, such as a transition from a package being staged to being in transit. Another notification may occur when a new user is permitted to access the shared user interface to view information about the package in transit.

Referring again to FIG. 3, host device 110 may identify permissions and access rights of parties involved in the shipment of the package (step 304). These permissions may be based on the role played by the party. For example, there may be a sender, shipper, and receiver involved in the shipment of the package. The sender may have an item that has been ordered, may package the item, and may provide the packaged item to a shipper. The shipper may transport the package via vehicle, for example, truck, train, boat, ship, or other means to the receiver. The receiver may take receipt of the package from the shipper. For the purposes of the embodiments disclosed here, the sender, receiver, and shipper are examples only. Additional or fewer parties may be involved.

Different parties may have different access rights based on, for example, the phase of the package's journey. For example, during the initial phase while an item is being packaged at the sender's site, the package may be considered as being "staged" for delivery. During this phase, the sender may have full permissions to view environmental data associated with the package, while the shipper and receiver may have limited permissions to ensure the privacy and security of the package. During staging the sender may use package sensor 202 to record aspects of conditions associated with the item to be shipped. For example, a photo showing a condition of an item may be recorded for later use. Similarly, during the phase when the package is being shipped, the shipper, shipper's business associates, and logistics partner(s) may have full permissions, while the sender and receiver may have limited permissions. And during the phase of package delivery, the receiver may have full permissions, while the sender and shipper may have limited permissions.

After identifying the access rights, host device 110 may provide the collected environmental data to the parties (step 306). For example, host device 110 may host a website that may be accessible from the Internet. The sender, shipper, and/or receiver may access client computers or other compatible devices to view the website and the environmental or contextual data about the package. For example, the website may display the GPS location of the package. The website may also display the temperature, humidity, and/or other environmental data associated with the package.

The website may also indicate alerts associated with the environmental data. For example, host device 110 may program an alert, which is triggered if the temperature of a package exceeds a particular value. This may be important if the packaged item is sensitive to heat, for example, and may spoil if the temperature exceeds a certain amount for a period of time. The website may also allow for parties, such as the sender, shipper, and/or receiver, to comment on events or alerts that are on the website. Instead of a website, other formats for data access and interaction may be used, such as via an application.

Host device 110 may also obfuscate at least portions of the environmental data to one or more select parties. For example, while the package is in transit and being shipped by the shipper, host device 110 may obfuscate location data of the package if accessed by the sender and receiver, for security and/or privacy purposes. By way of example, if sender or receiver accesses the website at a particular time, then host device 110 may provide location data of the transiting package from 30 minutes before that time. Thus, although host device 110 is still providing detailed location information of the package to the sender and receiver, the information is obfuscated to protect the privacy and security of the shipper. Otherwise, with open access to exact location information, the package may be in danger of being intercepted or stolen.

Environmental information other than location information may also be obfuscated. For example, temperature information may be obfuscated to certain parties. In one embodiment, host device 110 may provide a temperature range to a particular party instead of the exact temperature to protect the privacy of that information. Other obfuscation techniques may be used for other types of collected environmental data as well.

In some embodiments, host 110 may remove obfuscation of at least a portion of the environmental data upon completion of the shipment (step 310), For example, once the package arrives at its destination and is unpacked, host 110 may permit all parties to see data that was previously obfuscated. Host 110 may permit all parties to see exact temperature information throughout the journey of the package, for example. Host 110 also permits all parties to see the precise location information along the journey. In some embodiments, host 110 may determine from location information of package sensor 108 that the package has arrived at its destination. Based on that location information, host 110 may automatically trigger the removal of any obfuscated data.

Package sensor 108 may continue logging and storing information on host device 110 until package sensor 108 runs out of batteries or is reset. Therefore, there are several options for terminating the sensing capabilities of package sensor 108. One way is to terminate based on a scan of the package during shipment, such as a pickup scan or proof of delivery scan. Another way is by a location-based termination, such as by entry into a geofence or other geographic area. Yet another way is an environmental-based termination, for example, light sensing implying that shipment has been opened. Another way is a time-based termination, such as termination after a given amount of time. Moreover, these conditions may be set individually or combined. For instance, termination could occur 2 hours after a light alert is read within a destination location.

Host device 110 may remotely deactivate package sensor 108 upon completion of delivery (step 312). For example, using location information, host 110 may determine that package sensor 108 has arrived at the destination. This may trigger the remote deactivation of package sensor 108. Remote deactivation may mean a shutdown of package sensor 108. Alternatively or additionally, remote deactivation may mean a ceasing collection of data by package sensor 108, In one embodiment, remote deactivation may mean that the environmental data collected by package sensor 108 is no longer associated with the journey of a particular package. In some embodiments, the package sensor 108 may be deactivated manually, or may remain active. In some embodiments, steps 310 and 312 may be combined. Method 300 may then end.

Figure 4:
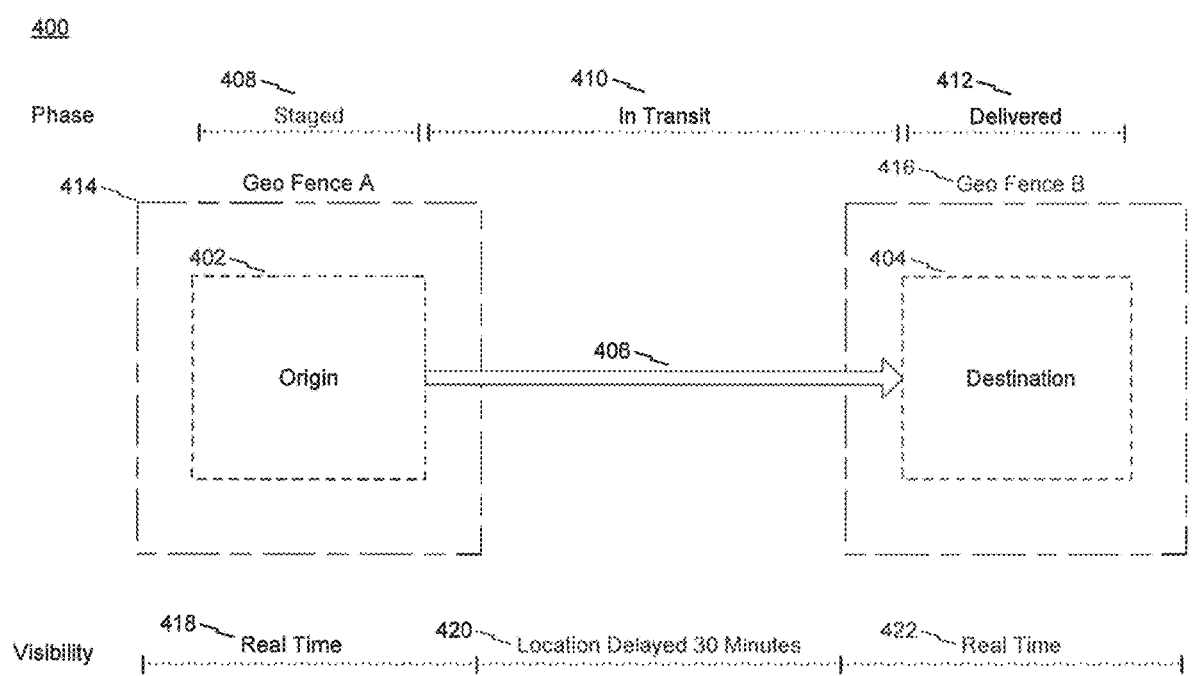
FIG. 4 is a diagram that illustrates how geofencing may be used to obfuscate or block access to environmental or contextual data collected by a package sensor.

FIG. 4 is a diagram 400 that illustrates how geofencing may be used to block environmental or contextual data collected by package sensor 108. Diagram 400 includes origin 402 and destination 404. Origin 402 may be a warehouse where a sender may package an item for shipment. The package may be shipped via route 406 to destination 404. Destination 404 may be a business or home where a receiver may take possession of the delivered package.

Different phases may be associated with the journey of a package from origin 402 to destination 404. "Staged" 408 may be a phase during which an ordered item is being packaged at origin 402. For example, origin 402 may be a warehouse that receives an order for an item. The item may be packaged and processed at origin 402. In one embodiment, as long as the item being shipped is within origin 402, it is being staged 408. According to diagram 400, once the packaged item leaves the premises of origin 402, it is travels on route 406 and is "In Transit" 410. This is a different phase in which the package may be transported by container, truck, airplane, boat or other means to its destination. When the package arrives at destination 404, it may be in the "Delivered" 412 phase. The delivered 412 phase may be when an ordered package has arrived at its physical destination, such as a home or business.

Each of origin 402 and destination 404 may be surrounded by a geofence. A geofence is understood in the art to be a geographical boundary, the crossing of which may trigger certain actions. The geofence may be a virtual perimeter at a threshold point around a location, such as a circle with a radius of 1 mile centered on a building or around a GPS location. Instead of distance, the threshold point may be measured by time, such that the geofence may be located after 30 minutes of travel from the building or GPS location. The geofence may also be delineated with specified GPS coordinates.

In diagram 400, origin 402 is surrounded by geofence A 414, while destination 410 is surrounded by geofence B 416. As a package travels on route 406, it may cross geofence A 414 as it leaves origin 402, and may then cross geofence B 416 as it approaches destination 404.

Data may be blocked to various parties depending on the crossing of geofences. In one example, the visibility by the sender of the environmental data may depend on the geofences. In diagram 400, if the package is within geofence A 414, then the sender may have a visibility of "Real Time." In this example, this means that the sender may view real-time location data about the package.

Once the package crosses GeoFence A 414 along route 406, however, the visibility for the sender changes, and the location of the package becomes obfuscated to the sender with a 30 minute delay, and remains obfuscated until the package crosses GeoFence B 416. In other words, when the sender accesses host device 110 while the package is on route 406 between GeoFence A 414 and GeoFence B 416, it will have access to location information of the package that is 30 minutes old. Thirty minutes is only an example, and any amount of time or other metric may be used. In this way, the sender can have access to detailed location information of the package, but not in real time. Thus, the location information is obfuscated to the sender. But once the package crosses GeoFence B 416, the sender is once again able to view the real-time location information of the package.

The locations of GeoFence A 414 and GeoFence B 416 may vary depending on the needs of an application. In one embodiment, GeoFence A 414 may be within a nearby vicinity of origin 402 while GeoFence B 416 may be within a nearby vicinity of destination 404. Alerts may also be triggered by the geo fence crossing. For example, when a package crosses GeoFence B 416, the host device 110 may display an alert that the package is nearing delivery.

Moreover, other factors may be relevant in the obfuscation of environmental data. For example, a sender may wish to obfuscate environmental data while the package is still on-site at origin 402 and/or within GeoFence A 414. In this example, for the purposes of privacy, the sender may not wish for other parties to have access to internal environmental conditions of its warehouse.

The point at which obfuscation is imposed or removed for a particular party may vary and is not limited to geofencing. FIG. 5 illustrates an example of a table 500 for identifying visibility of environmental or contextual data to a plurality of parties. Table 500 is an example in which obfuscation is determined based up the phase of a package's journey, and not necessarily on geofencing.

Table 500 includes columns 502-506, Items in column 502 indicate a party involved in the shipment of a package, either a sender, shipper, or receiver. Items in column 504 indicate a phase of the shipment, either staged, in transit, or delivered. And items in column 506 indicate permissions given by host device 110, either full or obfuscated.

Table 500 also includes rows 508-524, Rows 508-512 indicate that the sender's view of the environmental data is obfuscated while the package is in transit or being delivered, but not when the package is being staged. Moreover, rows 514-518 indicate that the shipper's view of the environmental data is obfuscated when the package is being staged or delivered, but not while the package is in transit. Finally, rows 520-524 indicate that the receiver's view of the environmental data is obfuscated when the package is being staged or is in transit, but not when the package is delivered. Table 500 is an example only, and various permissions in other formats may be used by disclosed embodiments.

Figure 6:
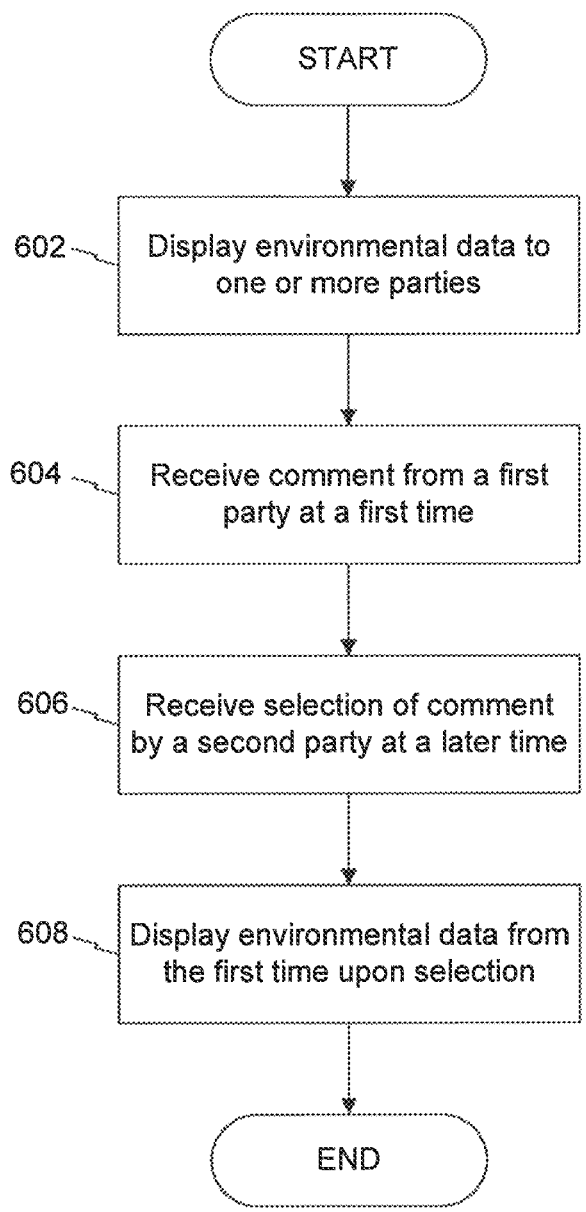
FIG. 6 illustrates operations of an example method for interacting with environmental or contextual data provided by a host device and/or related platform.

FIG. 6 illustrates operations of an example method 600 for interacting with environmental or contextual data provided by host device 110. Method 600 may be executed by CPU 214 on host device 110. Method 600 may also be performed in conjunction with other components not shown in system 100. As explained, some steps in method 600 are optional and can be rearranged. Additional steps can also be added to method 600.

To begin, host device 110 may display environmental data to one or more parties (step 602). For example, host device 110 may provide a website accessible by a sender, shipper, and/or receiver. In some embodiments, host device 110 may also provide the webpage to other third parties. The website may list environmental data, such as location, temperature, and/or humidity, associated with a package being shipped. The website may also list certain alerts, delivery predictions, and other information associated with the package's journey. In one embodiment, the website may permit a party to add comments to aspects of the website. For example, a party may be able to comment to an alert. In some cases, the ability to comment may be restricted to select parties.

Host device 110 may receive a comment from a first party at a first time (step 604). For example, a shipper may place a comment on a temperature alert. The temperature alert may state that the temperature surrounding a package has reached a level that may be dangerous to the contents of the package if maintained over time. The shipper may comment on this alert, by stating that the shipper has taken the necessary steps to decrease the temperature to acceptable levels. In view of these steps, the temperature may decrease and the alert may cease.

Host device 110 may then receive a selection of the comment by the same or a different party at a later time (step 606). For example, after the temperature has decreased, host device 110 may receive a selection of the shipper's comment by a receiving party. The receiving party may be interested to see what steps the shipper took to resolve the problem causing the temperature increase. In response, host device 110 may display the selected comment, as well as environmental data at the time the comment was made (step 608). This would permit the party who selected the comment to see the environmental conditions at the time of the comment. For example, the receiver who selected the comment would be able to see the temperature at the time of the comment, as well as the location and other environmental information and/or alerts at that time. This correlation between comments and real-time data helps recreate the conditions of a particular point in a journey, including objective environmental conditions and subjective comments by parties. In this way, a user can obtain a more complete context of a shipment's information by synchronizing environmental information, system-initiated messages (such as alerts), and user-initiated messages (such as comments) associated with a given point in time. As in the example discussed above, a user could see contextually that a temperature alert occurred at a given location with a user commenting on that instance.

Figure 7:
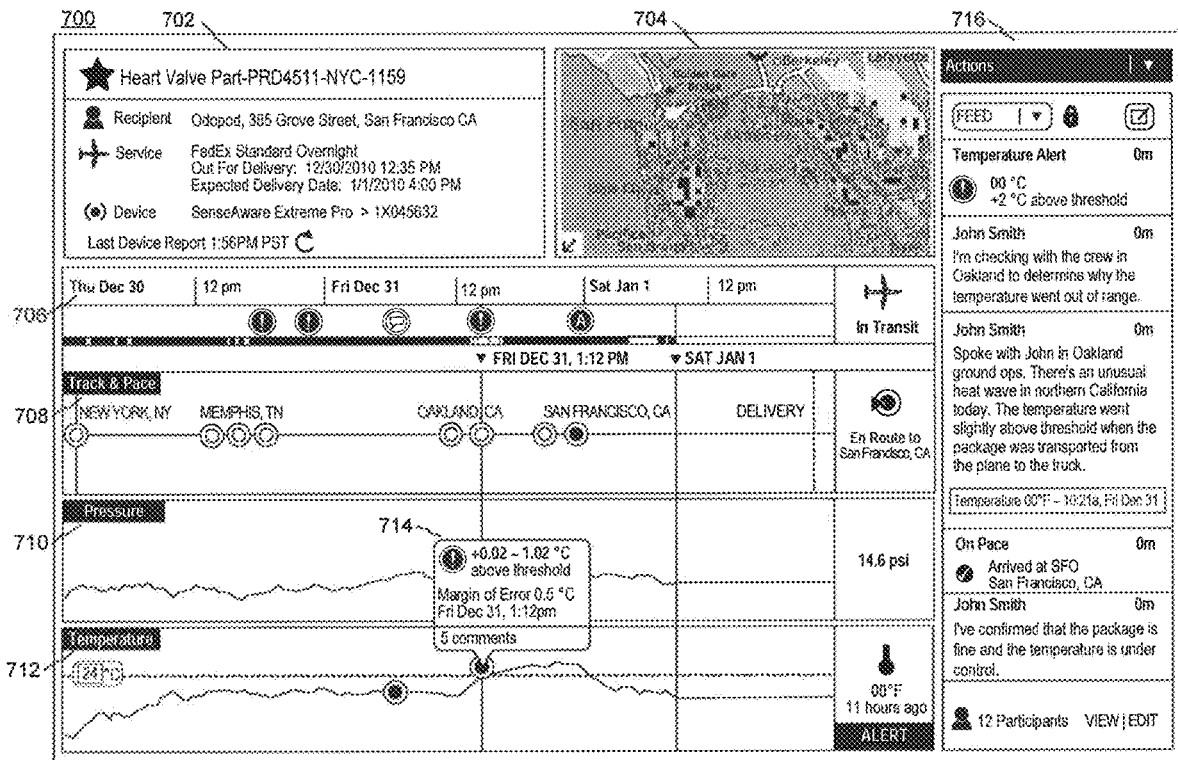
FIG. 7 includes a user interface that may be operated and/or presented by a host device for access by other parties.

FIG. 7 includes a user interface 700 that illustrates an example website shared user interface that may be displayed by host device 110 and accessed by other parties. User interface 700 includes an overview window 702 that identifies a heart valve being shipped to San Francisco via FedEx Standard Overnight delivery service. User interface 700 also includes map 704 of the shipment destination.

User interface 700 includes timeline 706, starting when the shipment began and ending at a predicted time of delivery. Timeline 706 also indicates the current status of the shipment, which is in transit. Although not shown here, in one embodiment, timeline 706 may include a countdown timer as a clock that displays the amount of time projected until the package arrives at its designated delivery point or at a specific delivery node or waypoint. Below timeline 706, user interface 700 includes Track and Pace window 708, which tracks the progress of the shipment over time as it travels from New York to San Francisco. Track and Pace window 708 also includes a current status which states that the package is currently en route to San Francisco, and also shows a projected delivery time.

In one embodiment, Track and Pace window 708 may assess the general state of the package's progress toward a given destination within a given amount of time (not shown). A state of "Off Track" may indicate that the package is outside the anticipated route. Similarly, a state of "Off Pace" may indicate that the package is behind schedule to reach an anticipated checkpoint along the route. This is accomplished by comparing a given shipment's location and pace to a schedule determined by predictive analytics. The predictive analytics may involve an algorithm that combines an aggregation of various data over time to define typical routes and times to reach certain points along each route. Data inputs may include: package scan data, GPS data, cellular location data, third party data sources like weather, traffic, crime, and customs information. Track and Pace window 708 includes circles at various points in time. The circles represent scans associated with a package. For example, a package may be scanned when leaving a processing center en route to its destination. A filled in circle may represent contextual information associated with a scan, such as a comment left in response to a scan event, or an alert associated with the scan. If a user hovers his/her mouse over the shaded circle, s/he may view the contextual information associated with the scan, depending on the privileges of the user.

User interface 700 also includes Pressure window 710, which tracks the atmospheric pressure in an area surrounding the package throughout its shipment. Below Pressure window 710, user interface 700 includes Temperature window 712, which shows the temperature in an area surrounding the package throughout its shipment. Temperature window 710 includes alert 714, which indicates that on Friday December 31 at 1:12 p.m., a temperature alert was triggered. Alert 714 may have been triggered because the temperature surrounding the package exceeded a threshold. Alert 714 has 5 comments associated with it, indicating that at least one party has commented on the temperature alert. As shown in user interface 700, a user named "John Smith" commented on the alert by stating actions that he took to investigate why the temperature alert occurred. These comments may be viewed and commented upon by other parties in a collaborative environment.

The view shown in FIG. 7 of alert 714 is the "hover" state. A more detailed view can be accessed as, for example, a pop-up window, to provide the user with a stream of all comments, notifications, and additional data in chronological order for that particular alert. In this pop up window, a user can also perform associated actions such as commenting, acknowledging/unacknowledging the alert, adding documentation or choosing from a pre-configured set of actions that an organization could create and share.

User interface 700 also includes an Actions window 716, which include an information feed. The information feed is a targeted view of contextual information and relevant sensor information for a particular shipment. A variety of elements are presented in the information feed, including comments and system-generated notifications and alerts. For example, the information feed shown in FIG. 7 references temperature alert 714 and comments that were made on temperature alert 714.

Elements in the information feed are organized by time, for example, the elements may be listed in chronological order beginning at a time at which delivery of the package has started. An information feed is viewable depending on the rights of the user attempting to access the feed. Therefore, is a particular user is not authorized to view alerts that take place in the transit phase, then those elements in the feed may be hidden from the particular user, but may be viewable to other users.

In one embodiment, user interface 700 may display the available battery life of package sensor 108. If the package is being staged and there are several package sensors to choose from for inclusion with the package being shipped, this may be used to determine which package sensor is in the appropriate charge state prior to inclusion in a shipment.

As discussed above, certain actions may be taken based on real-time environmental information, such as temperature alerts. Other actions may be initiated as well. One example is an automated inventory reorder based on location, environmental conditions, and/or predicted delivery times. Another is recovery initiation taken when there is a change in location and/or lack of logical/physical association to related sensors. For example, a security exposure may exist if a shipment has a device from a network, such as a mesh network, which is unexpectedly removed. In that case, host device 110 may initiate a recovery process on goods which may have been stolen or misplaced while in transit.

Another example of an action is coordinated customs/regulatory intervention based on location. When shipped items cross over into another country, they often go through customs. The customs officials may hold the shipment in a "caged" area until the shipment clears customs. Often, the caged area is not climate controlled, and so it may be desirable to clear customers as soon as possible.

In one embodiment, host device 110 may determine that a package is within a caged area, and may trigger certain actions based on the location in a caged area. For example, if a particular document is needed by the customs officials, that document can be provided by host device 110 when the package is determined to be in the caged area. In fact, customs officials may be a party that can access the website on host device 110, and may access the needed documentation from the website. In one embodiment, the document may be displayed in the feed of screenshot 700.

While certain features and embodiments of the invention have been described, other embodiments of the invention will be apparent to those skilled in the art from consideration of the specification and practice of the embodiments of the invention disclosed herein. Furthermore, although aspects of embodiments of the present invention have been described in part as software, computer-executable instructions, and/or other data stored in memory and other storage mediums, one skilled in the art will appreciate that these aspects can also be stored on or read from other types of tangible, non-transitory computer-readable media, such as secondary storage devices, like hard disks, floppy disks, or a CD-ROM, or other forms of RAM or ROM. Further, the steps of the disclosed methods may be modified in various ways, including by reordering steps and/or inserting or deleting steps, without departing from the principles of the invention.

It is intended that the specification and examples be considered as exemplary only, with a true scope and spirit of the invention being indicated by the following claims.

What is claimed is:

1. A system, comprising:
  an item in transit that comprises or is located in proximity to a sensor;
  at least one processor; and
  storage media storing program instructions, which, when executed by the at least one processor, cause the at least one processor to perform one or more operations, comprising:
    receiving, by a host device over a network, environmental data collected by the sensor while the item is in transit, the environmental data including real-time location data obtained via the sensor;
    identifying, by the host device, contextual data that comprises at least one of a phase of the item in transit, a risk level of the item in transit, an on-track notice of the item in transit, a notification associated with the item in transit, or a comment associated with the item in transit;
    identifying, by the host device, a party associated with the item and a level of access rights associated with the party;
    identifying, by the host device, an accessible portion of the environmental data and contextual data by obfuscating one or more elements of the received environmental data based on the access rights of the party;
    providing, by a user interface for the party, the accessible portion of the environmental and contextual data together as elements in an information feed to the party;
    determining, by the host device and based on the received environmental data, that the item has reached a destination;

providing, by the user interface, at least a portion of the obfuscated environmental data collected by the sensor while the item was in transit to the party; and deactivating, by the host device, the sensor based on the determination that the item has reached the destination.

2. The system of claim 1, wherein the contextual data is generated by a determination that a parameter of the environmental data has fallen outside of a permissible range.

3. The system of claim 1, wherein providing the accessible portion of the environmental data further comprises providing the received real-time location data associated with the item.

4. The system of claim 3, wherein the provided location data comprises an estimated geographic location within a number of miles, the number of miles based on the access rights of the party.

5. The system of claim 3, wherein the provided location data comprises a location of a waypoint along a journey of the item in transit.

6. The system of claim 1, wherein the destination is determined based on the received location data indicating the sensor has entered a geofenced area associated with the destination.

7. The system of claim 1, wherein the destination is determined based on identified contextual data comprising a package scan that indicates the item has been received at the destination.

8. The system of claim 1, further comprising:
determining that the item is in transit when the received location data indicates that the item has left a geofenced area associated with an origin of the item.

9. The system of claim 1, wherein the sensor comprises a GPS receiver.

10. The system of claim 1, wherein deactivating the sensor comprises sending a signal, by the host device, to power down the sensor.

11. The system of claim 1, wherein deactivating the sensor comprises sending a signal, by the host device, to cease the collection of environmental data by sensor.

12. The system of claim 1, wherein deactivating the sensor comprises ceasing, by the host device, to associate a particular journey with the item in transit.

13. The system of claim 1, wherein the received environmental data is pushed to the host device.

14. The system of claim 1, wherein the received environmental data is received in response to a request from the host device.

15. The system of claim 1, wherein determining the item has reached a destination is based on the received environmental data indicating detected light via the sensor.

16. A non-transitory computer-readable medium storing program instructions, which, when executed by at least one processor, cause the at least one processor to perform one or more operations providing information about an item in transit that comprises or is located in proximity to a sensor, comprising:
receiving, by a host device over a network, environmental data collected by the sensor while the item is in transit, the environmental data including real-time location data obtained via the sensor;
identifying, by the host device, contextual data that comprises at least one of a phase of the item in transit, a risk level of the item in transit, an on-track notice of the item in transit, a notification associated with the item in transit, or a comment associated with the item in transit;
identifying, by the host device, a party associated with the item and a level of access rights associated with the party;
identifying, by the host device, an accessible portion of the environmental data and contextual data by obfuscating one or more elements of the received environmental data based on the access rights of the party;
providing, by a user interface for the party, the accessible portion of the environmental and contextual data together as elements in an information feed to the party;
determining, by the host device and based on the received environmental data, that the item has reached a destination;
providing, by the user interface, at least a portion of the obfuscated environmental data collected by the sensor while the item was in transit to the party; and
deactivating, by the host device, the sensor based on the determination that the item has reached the destination.

17. The non-transitory computer-readable medium of claim 16, wherein the destination is determined based on the received location data indicating the sensor has entered a geofenced area associated with the destination.

18. The non-transitory computer-readable medium of claim 16, wherein the destination is determined based on identified contextual data comprising a package scan that indicates the item has been received at the destination.

19. A method of providing information about an item in transit that comprises or is located in proximity to a sensor, the method comprising:
receiving, by a host device over a network, environmental data collected by the sensor while the item is in transit, the environmental data including real-time location data obtained via the sensor;
identifying, by the host device, contextual data that comprises at least one of a phase of the item in transit, a risk level of the item in transit, an on-track notice of the item in transit, a notification associated with the item in transit, or a comment associated with the item in transit;
identifying, by the host device, a party associated with the item and a level of access rights associated with the party;
identifying, by the host device, an accessible portion of the environmental data and contextual data by obfuscating one or more elements of the received environmental data based on the access rights of the party;
providing, by a user interface for the party, the accessible portion of the environmental and contextual data together as elements in an information feed to the party;
determining, by the host device and based on the received environmental data, that the item has reached a destination;
providing, by the user interface, at least a portion of the obfuscated environmental data collected by the sensor while the item was in transit to the party; and
deactivating, by the host device, the sensor based on the determination that the item has reached the destination.

20. The method of claim 19, wherein the destination is determined based on the received location data indicating the sensor has entered a geofenced area associated with the destination.

* * * * *